2,880,163

PROCESS FOR PRODUCING AUXILIARY LIQUIDS FOR THE POLYMERIZATION OF ETHYLENE

Helmut Kolling, Duisburg-Hamborn, and Ewald Stiebling, Oberhausen-Sterkrade, Germany, assignors to Ruhrchemie Aktiengesellschaft, Oberhausen-Holten, Germany No Drawing. Application February 6, 1957
Serial No. 638,431

Claims priority, application Germany February 20, 1956

4 Claims. (Cl. 208—91)

The polymerization of ethylene at pressures below about 100 kg./sq. cm. and at temperatures up to about 100° C. is known. In this process, use is made of catalysts which consist of mixtures of organometallic compounds, especially aluminum alkyl compounds, and compounds of metals of the 4th to 6th subgroups of the periodic system (see Belgian Patents Nos. 532,362 and 534,792 and "Angewandte Chemie," 67, 541–547 (1955). In this synthesis, use is generally made of an auxiliary liquid in which the polyethylene formed is suspended. The auxiliary liquid serves to ensure good agitation of the reaction mixture until the synthesis is terminated, thus permitting the removal of the heat of reaction. It is necessary that the hydrocarbon fractions used as auxiliary liquid be very carefully freed from moisture and oxygen-containing compounds since otherwise the course of polymerization is disturbed. In general, the polymerization of ethylene is also impaired by a content of unsaturated hydrocarbons in the auxiliary liquid. Up to the present, fractions of aliphatic hydrocarbons in the gasoline or diesel oil boiling range have most widely been used as auxiliary liquid. Several processes have already been proposed for the preparation and purification of fractions of this kind.

However, in many cases, purely aliphatic hydrocarbon fractions as obtained, for example, in the Fischer-Tropsch synthesis, are not available. Petroleum-derived hydrocarbon fractions, however, are not directly suited as auxiliary liquid for the polymerization of ethylene. Due to impurities contained therein, especially sulfur-containing compounds, they cause considerable disturbances in the course of the polymerization.

It has been found that according to the invention hydrocarbon mixtures can be produced in a simple manner from petroleum which are suitable as auxiliary liquids for the polymerization of ethylene effected at pressures below about 100 kg./sq. cm. and at temperatures up to about 100° C. with the use of catalysts consisting of mixtures of organometallic compounds, especially aluminum alkyl compounds, and compounds of metals of the 4th to 6th subgroups of the periodic system, especially titanium compounds, e.g. titanium tetrachloride. This is done by first refining petroleum-derived distillates in the gasoline or diesel oil boiling range, in the vapor state and at temperatures between about 400 and 600° C., over $Al_2O_3$ and/or $SiO_2$-containing catalysts, subsequently passing them, together with hydrogen or hydrogen-containing gases and at temperatures between about 150 and 300° C., over a hydrogenation catalyst containing metallic nickel or cobalt, e.g. at pressures between 10 and 50 kg./sq. cm. with passage in the liquid phase in upward direction over fixed-bed catalysts, and subsequently drying the thus obtained products.

The refining over catalysts containing $Al_2O_3$ or $SiO_2$, e.g. $Al_2O_3$ catalysts, is effected in a manner known per se. The refining is effected in the vapor phase over fixed-bed catalysts with the flow rates being generally about 1 part by volume of gasoline per 1 part by volume of catalyst per hour. The temperature must be at least 400° C. It may be of advantage under certain circumstances to use higher temperatures, e.g. 500° or 550° C.

The hydrogenation is effected with the use of conventional hydrogenation catalysts containing metallic nickel or cobalt, e.g. kieselguhr-supported precipitated catalysts having the following composition: 100 parts by weight of nickel or cobalt, 15 parts by weight of magnesia, and 100 parts by weight of kieselguhr. Pure hydrogen or hydrogen-containing gases, e.g. $H_2N_2$ mixtures, may be used. The reaction temperatures should range between about 150 and 300° C. The hydrogenation may be carried out in various manners, e.g. with a catalyst suspended in a liquid or with a fixed-bed catalyst.

It has been found that it is particularly advantageous to carry out the hydrogenation by operating in the liquid phase at presures between 10 and 50 kg./sq. cm. in relatively long vertical tubes filled with a stationary catalyst, with the hydrocarbon mixture to be hydrogenated being passed through in upward direction.

By the refining which, according to the invention, is first effected over $Al_2O_3$ and/or $SiO_2$-containing catalysts, preferably over $Al_2O_3$ catalysts, e.g. bauxite, the impurities contained in petroleum distillates, especially sulfur-containing compounds, are removed to such an extent that the subsequent purification by a treatment with hydrogen can be effected with catalysts which are readily available but are normally sensitive to sulfur; such catalysts are the conventionally used catalysts containing nickel or cobalt. These catalysts have a surprisingly long life when used in the method according to the invention and this makes their application much more economical than usual. Catalysts of this kind have the advantage of effecting an extremely good purification of the hydrocarbon fractions. The sulfur content of the hydrocarbon fraction is reduced to below 0.001% by weight. The total content of oxygen-containing compounds after drying amounts to about 0.003 to 0.005% as determined with phenyl isopropyl potassium. By the hydrogenation, the content in unsaturated compounds is of course completely eliminated. Moreover, the content of aromatics is generally reduced to values of below 2%, which likewise has a favorable influence on the course of the polymerization.

After the hydrogenation, the gasoline has to be dried. This may be effected in a known manner, e.g. by passing it over granular calcined calcium chloride or solid caustic alkali.

In the following, the process according to the invention will be more fully described in the example but it should be understood that this is given by way of illustration and not of limitation and that many changes may be made in the details without departing from the spirit of the invention.

*Example 1*

A distillate derived from Arabian crude, boiling between 90 and 180° C. and having a sulfur content of 0.07% by weight is passed over a catalyst consisting of $Al_2O_3$ at 450° C. and at a rate of 1 part by volume of liquid distillate per 1 part by volume of catalyst per hour. The sulfur content of the refined product amounts to 0.007% by weight. Following this, the refined product is passed at a hydrogen partial pressure of 30 kg./sq. cm., in upward direction through a vertical tube 6 meters long and having an inside diameter of 50 mm. filled with pieces of nickel catalyst. The catalyst has the following composition: 100 parts by weight of nickel, 15 parts by weight of magnesia and 100 parts by weight of kieselguhr. The reaction temperature is maintained at 200° C., the residence time in the reaction chamber is about 2 hours. The product thus treated is then passed through a vertical tube 4 meters long and having an inside diameter of 200 mm. filled with granular calcined calcium chloride, the residence time being 1.5 hours. The final product obtained has a sulfur content of 0.0004% by weight and a content of aromatics of 1%. The analytical characteristics such as neutralization number, saponification number, hydroxyl number, and iodine number are zero. The total oxygen content amounts to 0.004% as determined with phenyl isopropyl potassium.

The yield of polyethylene obtained when using this fraction as an auxiliary liquid in the polymerization of ethylene effected with a catalyst consisting of 57% by weight of titanium tetrachloride and 43% by weight of diethyl aluminum monochloride is 345 grams of polyethylene per gram of catalyst.

Example 2

A distillate derived from Arabian crude, boiling between 90 and 180° C. and having a sulfur content of 0.07% by weight is passed over a catalyst consisting of 90% of $SiO_2$ and 10% of $Al_2O_3$ at 450° C. and at a rate of 1 part by volume of liquid distillate per 1 part by volume of catalyst per hour. The sulfur content of the refined product amounts to 0.009% by weight. Following this, the refined product is passed at a hydrogen partial pressure of 30 kg./sq. cm. in upward direction through a vertical tube 6 meters long and having an inside diameter of 50 mm. filled with pieces of cobalt catalyst. The catalyst has the following composition: 100 parts by weight of cobalt, 15 parts by weight of magnesia and 100 parts by weight of kieselguhr. The reaction temperature is maintained at 250° C., the residence time in the reaction chamber is about 2 hours. The product thus treated is then passed through a vertical tube 4 meters long and having an inside diameter of 200 mm. filled with pieces of calcined calcium chloride, the residence time being 1.5 hours. The final product obtained has a sulfur content of 0.0005% by weight and a content of aromatics of about 1%. The analytical characteristics such as neutralization number, saponification number, hydroxyl number and iodine number are zero. The total oxygen content amounts to 0.0035% as determined with phenyl isopropyl potassium.

The yield of polyethylene obtained when using this fraction as an auxiliary liquid in the polymerization of ethylene effected with a catalyst consisting of 57% by weight of titanium tetrachloride and 43% by weight of diethyl aluminum monochloride is 330 grams of polyethylene per gram of catalyst.

What we claim is:

1. A process for producing, from petroleum, hydrocarbon mixtures to be used as auxiliary liquids for the polymerization of ethylene effected at pressures below about 100 kg./sq. cm. and at temperatures up to about 100° C. with the use of catalysts consisting of mixtures of organometallic compounds with compounds of metals of the 4th to 6th subgroups of the periodic system, which comprises first refining said petroleum-derived distillates in the gasoline and diesel oil boiling range, in the vapor state and at temperatures between 400 and 600° C., over a catalyst selected from the group consisting of $Al_2O_3$, $SiO_2$, and a mixture thereof, subsequently passing said distillates together with a hydrogen-containing gas at temperatures between about 150 and 300° C. over a hydrogenation catalyst containing a metal selected from the group consisting of nickel and cobalt with passage of the hydrocarbons in the liquid phase in upward direction over said catalysts distributed in a fixed bed, and finally drying the purified and hydrogenated distillates.

2. The process for producing the auxiliary liquid for the polymerization of ethylene according to claim 1, which comprises carrying out the process of refining the petroleum-derived distillates at temperatures between 500 and 550° C.

3. The process for producing the auxiliary liquid for the polymerization of ethylene according to claim 1, which comprises carrying out the hydrogenation of the hydrocarbon distillates with hydrogen.

4. The process for producing the auxiliary liquid for the polymerization of ethylene according to claim 1, wherein the hydrogenation step of the hydrocarbon mixture is carried out at pressures ranging from 10 to 50 kg./sq. cm.

References Cited in the file of this patent
UNITED STATES PATENTS

| | | |
|---|---|---|
| 2,419,029 | Oberfell | Apr. 15, 1947 |
| 2,421,320 | Ernest | May 27, 1947 |
| 2,461,069 | Marisic et al. | Feb. 8, 1949 |
| 2,769,753 | Hutchings et al. | Nov. 6, 1956 |
| 2,769,762 | Annable et al. | Nov. 6, 1956 |
| 2,771,401 | Shepherd | Nov. 20, 1956 |